(12) United States Patent
Sasaki et al.

(10) Patent No.: US 12,326,501 B2
(45) Date of Patent: Jun. 10, 2025

(54) OBJECT DETECTION SYSTEM

(71) Applicant: Murata Manufacturing Co., Ltd., Nagaokakyo (JP)

(72) Inventors: Shinichi Sasaki, Nagaokakyo (JP); Takaaki Asada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 155 days.

(21) Appl. No.: 18/215,328

(22) Filed: Jun. 28, 2023

(65) Prior Publication Data
US 2023/0341546 A1    Oct. 26, 2023

Related U.S. Application Data

(63) Continuation of application No. PCT/JP2021/037865, filed on Oct. 13, 2021.

(30) Foreign Application Priority Data

Mar. 3, 2021    (JP) ................................. 2021-033500

(51) Int. Cl.
G01S 15/04    (2006.01)
G01S 7/52    (2006.01)
G01S 7/526    (2006.01)

(52) U.S. Cl.
CPC .......... *G01S 15/04* (2013.01); *G01S 7/52004* (2013.01); *G01S 7/526* (2013.01); *G01S 2007/52007* (2013.01)

(58) Field of Classification Search
CPC ........ G01S 15/104; G01S 15/04; G01S 7/524; G01S 15/931; G01S 7/526; G01S 7/52004; G01S 7/521; G01S 2007/52007
See application file for complete search history.

(56) References Cited

U.S. PATENT DOCUMENTS 6,572,546 B1    6/2003    Bax et al.
9,838,802 B1    12/2017    Howarth et al.
(Continued)

FOREIGN PATENT DOCUMENTS

JP    2018105703 A    7/2018
JP    2019066192 A    4/2019
(Continued)

OTHER PUBLICATIONS

International Search Report in PCT/JP2021/037865, mailed Dec. 7, 2021, 3 pages.
(Continued)

*Primary Examiner* — Daniel L Murphy
*Assistant Examiner* — Amie M Ndure
(74) *Attorney, Agent, or Firm* — Keating & Bennett, LLP (57) ABSTRACT

An object detection system includes a processing circuit to perform wave transmission processing and determination processing. In the wave transmission processing, an acoustic wave generator is controlled to generate a series of acoustic waves of a time-varying frequency at target sound pressures associated with a frequency and correspond to the respective acoustic waves. In the determination processing, a received-wave signal representing an acoustic wave from a target space received by a wave receiver is acquired and it is determined whether an object is present in the target space based on the received-wave signal. Each of the target sound pressures is set based on the frequency characteristics of sensitivity of the wave receiver to an acoustic wave of a predetermined sound pressure, such that the sensitivity of the wave receiver to an acoustic wave of the target sound pressure is in a predetermined range including a predetermined value.

20 Claims, 6 Drawing Sheets

(56) References Cited

U.S. PATENT DOCUMENTS

| | | | |
|---|---|---|---|
| 10,444,350 B2* | 10/2019 | Hustava | G01S 15/104 |
| 2016/0238700 A1* | 8/2016 | Matsuura | G01S 15/931 |
| 2017/0227640 A1* | 8/2017 | Nomura | G08G 1/166 |
| 2018/0031701 A1 | 2/2018 | Hustava et al. | |
| 2019/0276030 A1* | 9/2019 | Maeda | G01S 7/53 |
| 2020/0225346 A1* | 7/2020 | Suzuki | G01S 7/526 |
| 2020/0304924 A1 | 9/2020 | Sasaki et al. | |
| 2021/0231799 A1* | 7/2021 | Fujiwara | G01S 15/931 |

FOREIGN PATENT DOCUMENTS

| | | |
|---|---|---|
| WO | 2019159400 A1 | 8/2019 |
| WO | 2020004609 A1 | 1/2020 |

OTHER PUBLICATIONS

Written Opinion in PCT/JP2021/037865, mailed Dec. 7, 2021, 3 pages.

* cited by examiner

OBJECT DETECTION SYSTEM

CROSS REFERENCE TO RELATED APPLICATIONS

This application claims the benefit of priority to Japanese Patent Application No. 2021-033500 filed on Mar. 3, 2021 and is a Continuation Application of PCT Application No. PCT/JP2021/037865 filed on Oct. 13, 2021. The entire contents of each application are hereby incorporated herein by reference.

BACKGROUND OF THE INVENTION

1. Field of the Invention

The present disclosure generally relates to object detection systems, and, more particularly, to an object detection system to detect an object using acoustic waves.

2. Description of the Related Art

Japanese Unexamined Patent Application Publication No. 2018-105703 discloses an object detection device (object detection system). The object detection device disclosed in Japanese Unexamined Patent Application Publication No. 2018-105703 uses a plurality of ultrasound sensors for transmitting ultrasound waves from a transducer and generating a received-wave signal based on the vibration of the transducer to detect an object that is present around a mobile unit based on reflected waves (echoes) received by the ultrasound sensors (wave receivers).

SUMMARY OF THE INVENTION

Preferred embodiments of the present invention provide object detection systems with each of which object detection accuracy is improved.

An object detection system according to a preferred embodiment of the present invention includes an acoustic wave generator to generate an acoustic wave by generating heat upon energization and a processing circuit to perform object detection processing to detect an object in target space using an acoustic wave from the acoustic wave generator. The object detection processing includes wave transmission processing and determination processing. In the wave transmission processing, the acoustic wave generator is controlled to generate a series of acoustic waves of a time-varying frequency at target sound pressures that are associated with a frequency and correspond to the respective acoustic waves. In the determination processing, a received-wave signal representing an acoustic wave received by a wave receiver to receive an acoustic wave from the target space is acquired from the wave receiver and it is determined whether the object is present in the target space based on the received-wave signal. Each of the target sound pressures is set, based on frequency characteristics of sensitivity of the wave receiver to an acoustic wave of a predetermined sound pressure, such that sensitivity of the wave receiver to an acoustic wave of the target sound pressure is in a predetermined range including a predetermined value. A frequency of the series of acoustic waves varies in a predetermined frequency range. The predetermined value is a maximum value of the sensitivity of the wave receiver to an acoustic wave of a predetermined sound pressure in the predetermined frequency range.

An object detection system according to a preferred embodiment of the present disclosure includes an acoustic wave generator to generate an acoustic wave by generating heat upon energization and a processing circuit to perform object detection processing to detect an object in target space using an acoustic wave from the acoustic wave generator. The object detection processing includes wave transmission processing and determination processing. In the wave transmission processing, the acoustic wave generator is controlled to generate a series of acoustic waves of a time-varying frequency at target sound pressures that are associated with a frequency and correspond to the respective acoustic waves. In the determination processing, a received-wave signal representing an acoustic wave received by a wave receiver to receive an acoustic wave from the target space is acquired from the wave receiver and it is determined whether the object is present in the target space based on the received-wave signal. A frequency of the series of acoustic waves varies in a predetermined frequency range. Each of the target sound pressures is set, based on frequency characteristics of sensitivity of the wave receiver to an acoustic wave of a predetermined sound pressure, such that sensitivity of the wave receiver to an acoustic wave of the target sound pressure coincides with a predetermined value. The predetermined value is a maximum value of the sensitivity of the wave receiver to an acoustic wave of a predetermined sound pressure in the predetermined frequency range.

According to preferred embodiments of the present invention, object detection accuracy is improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiment

1. Summarization

As one of methods of detecting an object or measuring a distance to an object with high accuracy, a cross-correlation processing method using a cross-correlation function has been proposed. In the cross-correlation processing method, a transmitted-wave signal representing a transmitted acoustic wave and a received-wave signal representing a received echo are compared with each other. The higher the degree of coincidence between a transmitted-wave signal and a received-wave signal, the higher the S/N. A chirp signal in which a frequency changes with time is used for transmission of an acoustic wave, and a microphone receives an echo. In this case, the microphone has frequency characteristics in which the sensitivity of the microphone significantly changes with respect to frequency while the sound pressure of an acoustic wave has flat frequency characteristics in which the amount of change in the sound pressure with respect to frequency is small. Accordingly, a received-wave signal is distorted under the influence of the frequency characteristics of a microphone despite the flat frequency characteristics of the sound pressure of an acoustic wave. When the distorted received-wave signal and a transmitted-wave signal are compared, an S/N ratio decreases and the accuracy of detecting an object or measuring a distance to an object decreases.

An object detection system 1 according to a preferred embodiment of the present invention reduces or prevents the distortion of a received-wave signal caused by the frequency characteristics of a wave receiver, such as a microphone, and improves object detection accuracy.

Figure 1:
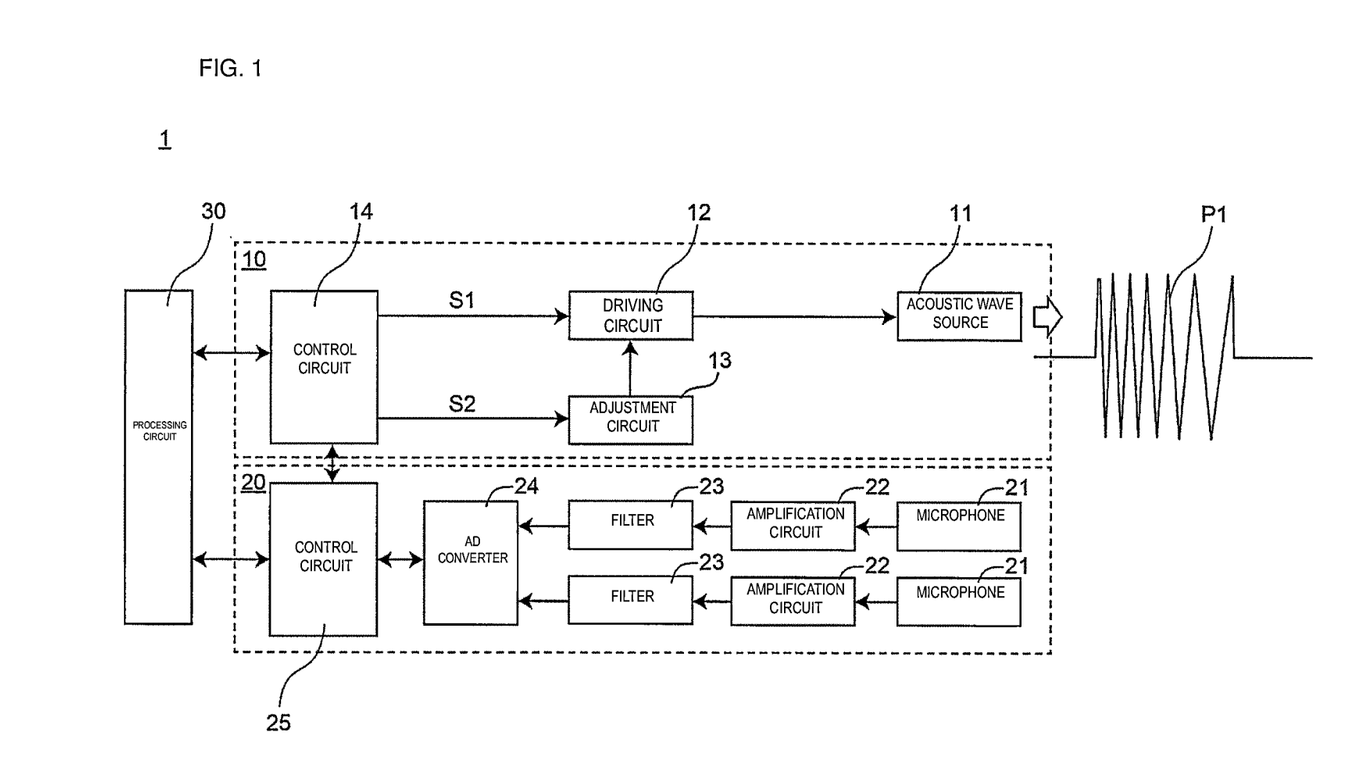
FIG. 1 is a block diagram illustrating an exemplary configuration of an object detection system according to a preferred embodiment of the present invention.

FIG. 1 is a block diagram illustrating an exemplary configuration of the object detection system 1 according to a preferred embodiment of the present invention. The object detection system 1 can detect an object in target space using acoustic waves. For example, the object detection system 1 is used in a mobile unit to detect an object, such as an obstacle. Examples of a mobile unit include a vehicle such as an automobile, an unmanned plane such as a drone, and an autonomous mobile robot such as a robot cleaner.

As illustrated in FIG. 1, the object detection system 1 includes an acoustic wave generator 10 to generate an acoustic wave by generating heat upon energization and a processing circuit 30 to perform object detection processing to detect an object in target space using an acoustic wave from the acoustic wave generator 10. The object detection processing includes wave transmission processing and determination processing. In the wave transmission processing, the acoustic wave generator 10 is controlled to generate a series of acoustic waves P1 of a time-varying frequency at target sound pressures that are associated with a frequency and correspond to the respective acoustic waves P1. In the determination processing, a received-wave signal representing an acoustic wave received by a wave receiver 20 to receive an acoustic wave from target space is acquired from the wave receiver 20 and it is determined whether an object is present in the target space based on the received-wave signal. The target sound pressure is set, based on the frequency characteristics of the sensitivity of the wave receiver 20 to an acoustic wave of a predetermined sound pressure, such that the sensitivity of the wave receiver 20 to an acoustic wave of the target sound pressure is in a predetermined range including a predetermined value. The frequency of a series of the acoustic waves P1 varies in a predetermined frequency range. The predetermined value is the maximum value of the sensitivity of the wave receiver 20 to the acoustic wave P1 of a predetermined sound pressure in the predetermined frequency range.

The object detection system 1 illustrated in FIG. 1 can set the respective sound pressures of a series of the acoustic waves P1 of a time-varying frequency to be output from the acoustic wave generator 10 to target sound pressures associated with a frequency. That is, a sound pressure can be set in accordance with the frequency of the acoustic wave P1. Accordingly, the influence of frequency characteristics of sensitivity of the wave receiver 20 can be reduced and the decrease in object detection accuracy due to the distortion of a received-wave signal can be reduced or prevented. As described above, object detection accuracy can be improved by using the object detection system 1.

2. Details

The object detection system 1 will be described below with reference to drawings. As illustrated in FIG. 1, the object detection system 1 includes the acoustic wave generator 10, the wave receiver 20, and the processing circuit 30.

2-1. Acoustic Wave Generator

The acoustic wave generator 10 illustrated in FIG. 1 includes an acoustic wave source 11, a driving circuit 12, an adjustment circuit 13, and a control circuit 14.

The acoustic wave source 11 generates an acoustic wave by generating heat upon energization. More specifically, the acoustic wave source 11 is, for example, a thermal excitation element that generates an acoustic wave by heating air. The acoustic wave source 11 is a thermophone. The acoustic wave source 11 includes, for example, a heating element, a substrate, a pair of electrodes, and a heat-insulating layer. A heating element is a resistance element that generates heat when a current flows therethrough. For example, a heating element is disposed on a substrate such that it is exposed to air. Air around a heating element expands or contracts in response to the change in the temperature of the heating element, so that an air pressure wave, that is, an acoustic wave, is generated. A heat-insulating layer reduces or prevents the transfer of heat from a heating element to a substrate. A pair of electrodes are used to flow a current from the outside of the acoustic wave source 11 to a heating element. One of electrodes in a pair is provided on one side of a heating element, and the other one of the electrodes is provided on the other side of the heating element. The acoustic wave source 11 may have a configuration known in the related art, and the detailed description of the acoustic wave source 11 will be omitted.

Figure 2:
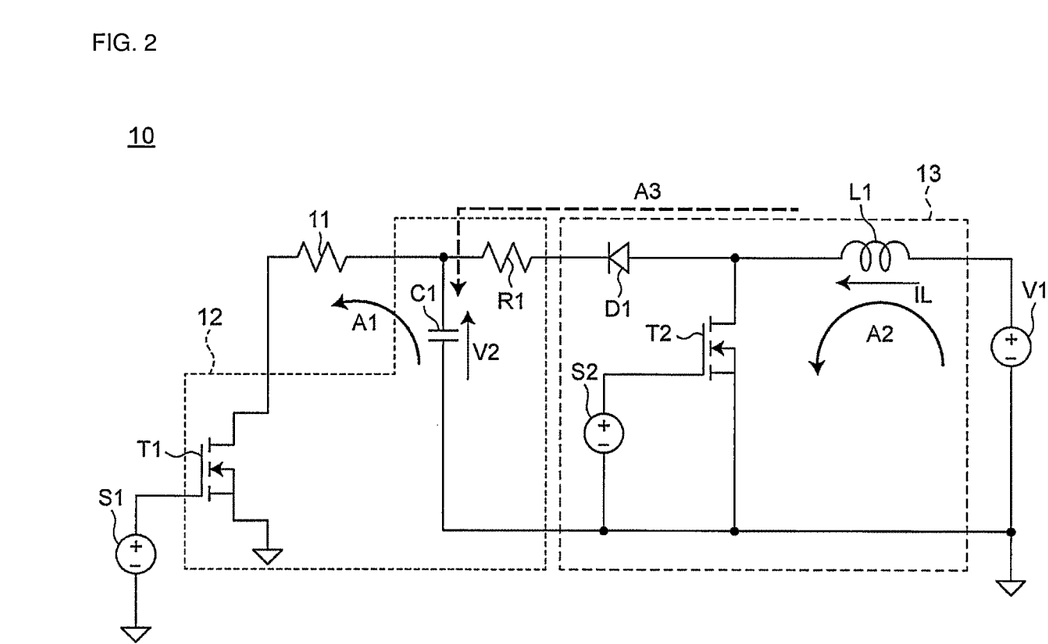
FIG. 2 is a circuit diagram illustrating an exemplary configuration of an acoustic wave generator included in the object detection system in FIG. 1.

FIG. 2 is a circuit diagram illustrating an exemplary configuration of the acoustic wave generator 10. As illustrated in FIG. 2, the acoustic wave source 11 is electrically connected between a direct-current power supply V1 and the ground.

The direct-current power supply V1 includes, for example, various power supply circuits and/or a battery. Various power supply circuits include, for example, an AC/DC converter, a DC/DC converter, a regulator, and a battery. The voltage value of the direct-current power supply V1 is, for example, about 5 V.

The driving circuit 12 supplies power to the acoustic wave source 11 to allow the acoustic wave source 11 to generate an acoustic wave. As illustrated in FIG. 2, the driving circuit 12 includes a capacitor C1, a driving switching element T1, and a resistor R1.

The capacitor C1 is used to supply power to the acoustic wave source 11. The capacitor C1 is electrically connected between the ground and the node between the direct-current power supply V1 and the acoustic wave source 11. The capacitor C1 is, for example, an electrolytic capacitor or a ceramic capacitor.

The driving switching element T1 is used to drive the acoustic wave source 11 by controlling the supply of power to the acoustic wave source 11. The driving switching element T1 is electrically connected between the acoustic wave source 11 and the ground. The driving switching element T1 is, for example, an n-type MOSFET. When the driving switching element T1 is in the ON state, power is supplied to the acoustic wave source 11. Referring to FIG. 2, a current flows from the capacitor C1 to the acoustic wave source 11 as represented by an arrow A1 and power is supplied to the acoustic wave source 11. When the driving switching element T1 is in the OFF state, power is not supplied to the acoustic wave source 11. Bringing the driving switching element T1 into the ON or OFF state allows the acoustic wave source 11 to generate the acoustic wave P1. In the present disclosure, "an acoustic wave" is a sinusoidal wave in one period and "a series of acoustic waves" is a sinusoidal wave in a plurality of periods.

The resistor R1 defines an overcurrent protection element electrically connected between the capacitor C1 and the direct-current power supply V1. The resistor R1 limits a current that directly flows from the direct-current power supply V1 to the acoustic wave source 11. The excessive heat generation of the acoustic wave source 11 can be reduced or prevented by using the resistor R1. The resistance value of the resistor R1 is, for example, from about 50 Ω to about 5 kΩ.

In the driving circuit 12, a current flows from the capacitor C1 to the acoustic wave source 11 and power is supplied to the acoustic wave source 11. Accordingly, the sound pressure of an acoustic wave to be output from the acoustic wave source 11 depends on a voltage V2 across the capacitor C1.

The adjustment circuit 13 adjusts the sound pressure of an acoustic wave to be output from the acoustic wave generator 10 by adjusting the voltage V2 across the capacitor C1 in the driving circuit 12. As illustrated in FIG. 2, the adjustment circuit 13 includes an inductor L1, an adjustment switching element T2, and a diode D1. The inductor L1 is electrically connected between the direct-current power supply V1 and the capacitor C1. Referring to FIG. 2, the inductor L1 is electrically connected between the resistor R1 that is an overcurrent protection element and the direct-current power supply V1. The adjustment switching element T2 is electrically connected in parallel to the series circuit of the inductor L1 and the direct-current power supply V1. The adjustment switching element T2 is, for example, an n-type MOSFET. The inductor L1, the direct-current power supply V1, and the adjustment switching element T2 define a closed loop. When the adjustment switching element T2 is in the ON state, energy is stored in the inductor L1. Referring to FIG. 2, a current flows through the closed loop defined by the direct-current power supply V1, the inductor L1, and the adjustment switching element T2 as represented by an arrow A2 and energy is stored in the inductor L1. When the state of the adjustment switching element T2 is changed from the ON state to the OFF state, an induced electromotive force is generated in the inductor L1. As a result, a current flows from the inductor L1 to the capacitor C1 as represented by an arrow A3 and the capacitor C1 is charged. The adjustment circuit 13 illustrated in FIG. 2 can charge the capacitor C1 and can therefore adjust the voltage V2 across the capacitor C1. Energy to be stored in the inductor L1 is adjusted in the ON state of the adjustment switching element T2. The diode D1 is electrically connected between the inductor L1 and the capacitor C1. In particular, the anode of the diode D1 is electrically connected to the inductor L1 and the cathode of the diode D1 is electrically connected to the capacitor C1. The diode D1 reduces the possibility that a current flows from the capacitor C1 to the inductor L1 and the capacitor C1 is accidentally discharged.

The control circuit 14 is configured to control the driving circuit 12 and the adjustment circuit 13. The control circuit 14 includes, for example, an oscillator to output driving signals S1 and S2 to be described below. The control circuit 14 is, for example, an integrated circuit such as an FPGA (field-programmable gate array). The control circuit 14 controls the adjustment circuit 13 to set the voltage V2 across the capacitor C1 in the driving circuit 12 to a value corresponding to a target sound pressure while controlling the switching of the driving switching element T1 in the driving circuit 12 to allow the acoustic wave source 11 to generate a series of the acoustic waves P1.

The control circuit 14 controls the switching (ON/OFF) of the driving switching element T1 in the driving circuit 12. The control circuit 14 performs an operation of causing the acoustic wave source 11 to generate a series of the acoustic waves P1 by controlling the driving switching element T1 in the driving circuit 12.

As illustrated in FIG. 1, the control circuit 14 outputs the driving signal S1 to control the switching of the driving switching element T1. The switching frequency of the driving switching element T1 corresponds to the frequency of a series of the acoustic waves P1. Accordingly, for the generation of a series of the acoustic waves P1 of a time-varying frequency, the switching frequency of the driving switching element T1 may be changed with time. The frequency of a series of the acoustic waves P1 is set to vary in a predetermined frequency range. For example, the predetermined frequency range is from about 20 kHz to about 150 kHz. In this case, the switching frequency of the driving switching element T1 is also set to vary in this predetermined frequency range.

In the present preferred embodiment, the driving switching element T1 is, for example, a MOSFET and the driving signal S1 is input to the gate of the driving switching element T1. While the driving signal S1 is at a high level, the driving switching element T1 is in the ON state. While the driving signal S1 is at a low level, the driving switching element T1 is in the OFF state. The driving signal S1 is illustrated as a direct-current power supply in FIG. 2.

Figure 3:
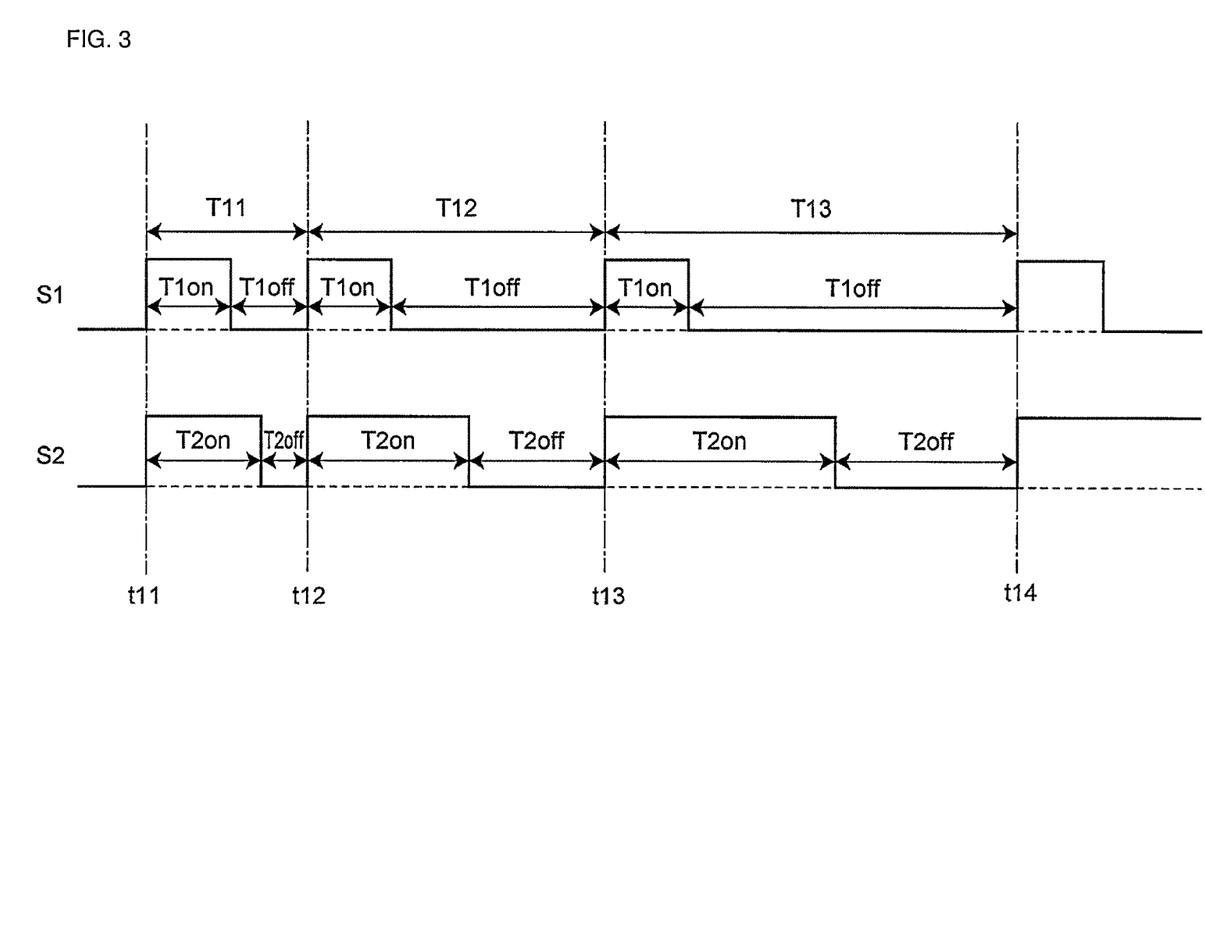
FIG. 3 is a timing chart describing the operation of the acoustic wave generator in FIG. 1.

As illustrated in FIG. 3, the driving signal S1 is a pulse train signal, the period of which changes with time. Such a signal is a chirp signal. The period of a pulse train of the driving signal S1 is set in accordance with the switching frequency of the driving switching element T1. Referring to FIG. 3, the period of the driving signal S1 increases with time from T11, T12, T13, . . . . Accordingly, the driving signal S1 illustrated in FIG. 3 is a pulse train, the period of which increases with time. With the driving signal S1 illustrated in FIG. 3, the switching frequency of the driving switching element T1 decreases with time. As a result, a series of acoustic waves P of a frequency that decreases with time is output from the acoustic wave source 11. The length of the driving signal S1 can be set, for example, from about 5 ms to about 30 ms. The pulse width of the driving signal S1 is set based on the target duty ratio of the driving switching element T1.

The period of the driving signal S1 includes an ON period T1on and an OFF period T1off of the driving switching element T1. The ON period T1on is a period in which the driving switching element T1 is in the ON state. In the ON period T1on, a current flows from the capacitor C1 to the acoustic wave source 11 and power is supplied to the acoustic wave source 11. The OFF period T1off is a period in which the driving switching element T1 is in the OFF state. In the OFF period T1off, a current does not flow from the capacitor C1 to the acoustic wave source 11 and power is not supplied to the acoustic wave source 11.

The control circuit 14 controls the switching (ON/OFF) of the adjustment switching element T2 in the adjustment circuit 13. The control circuit 14 performs an operation of adjusting the voltage V2 across the capacitor C1 in the driving circuit 12 by controlling the adjustment switching element T2 in the adjustment circuit 13. As illustrated in FIG. 1, the control circuit 14 outputs the driving signal S2 to control the switching of the adjustment switching element T2. In the present preferred embodiment, the adjustment switching element T2 is, for example, a MOSFET and the driving signal S2 is input to the gate of the adjustment switching element T2. The adjustment switching element T2 is in the ON state while the driving signal S2 is at the high level. The adjustment switching element T2 is in the OFF state while the driving signal S2 is at the low level. Referring to FIG. 2, the driving signal S2 is illustrated as a direct-current power supply.

In the ON period T1on, power is supplied from the capacitor C1 to the acoustic wave source 11 and the acoustic wave P1 is output from the acoustic wave source 11. The control circuit 14 causes the adjustment circuit 13 to adjust the voltage V2 across the capacitor C1 before the ON period T1on. The control circuit 14 outputs the driving signal S2 to the adjustment switching element T2 to control the adjustment circuit 13 to adjust the voltage V2 across the capacitor C1.

Referring to FIG. 3, the driving signal S2 is a pulse train signal. The driving signal S2 is synchronized with the driving signal S1. Accordingly, the period of the driving signal S2 is the same or substantially the same as that of the driving signal S1. The adjustment switching element T2 is switched from the ON state to the OFF state before the ON period T1on of the driving switching element T1 in each period. The period of the driving signal S2 includes an ON period T2on and an OFF period T2off of the adjustment switching element T2. The ON period T2on is a period in which the adjustment switching element T2 is in the ON state. In the ON period T2on, a current flows from the direct-current power supply V1 to the inductor L1 and energy is stored in the inductor L1. The OFF period T2off is a period in which the adjustment switching element T2 is in the OFF state. In the OFF period T2off, a current flows from the inductor L1 to the capacitor C1 and the capacitor C1 is charged. Accordingly, the voltage V2 across the capacitor C1 can be adjusted using the length of the ON period T2on. The longer the ON period T2on of the driving signal S2, the larger the amount of energy stored in the inductor L1 in the adjustment circuit 13.

As illustrated in FIG. 3, the control circuit 14 changes the state of the adjustment switching element T2 from the ON state to the OFF state before the ON period T1on of the driving switching element T1. As a result, the voltage V2 across the capacitor C1 can be set to a voltage based on the ON period T2on of the adjustment switching element T2.

2-2. Wave Receiver

The wave receiver 20 receives an acoustic wave and outputs a received-wave signal representing the received acoustic wave to the processing circuit 30. The wave receiver 20 illustrated in FIG. 1 includes a plurality of (for example, two in the drawing) microphones 21, a plurality of (for example, two in the drawing) amplification circuits 22, a plurality of (for example, two in the drawing) filters 23, an AD converter 24, and a control circuit 25.

The microphone 21 is an electroacoustic transducer element to convert an acoustic wave into an electric signal. Upon receiving an acoustic wave, the microphone 21 outputs an analog received-wave signal representing the received acoustic wave. The microphone 21 is used to detect an acoustic wave that has been output from the acoustic wave source 11 and then reflected from an object. The amplification circuit 22 amplifies an analog received-wave signal from the microphone 21 and outputs the amplified signal. The filter 23 passes a signal in a pass band including the frequency band of an acoustic wave. The filter 23 is, for example, a bandpass filter. The AD converter 24 converts an analog received-wave signal that has passed through the filter 23 into a digital received-wave signal and outputs the digital received-wave signal to the control circuit 25. The microphone 21, the amplification circuit 22, the filter 23, and the AD converter 24 may have respective configurations known in the related art, and the detailed description thereof will be omitted.

The control circuit 25 controls the AD converter 24 to cause the AD converter 24 to output a digital received-wave signal to the control circuit 25. The control circuit 25 outputs a digital received-wave signal output from the AD converter 24 to the processing circuit 30. The control circuit 25 is, for example, an integrated circuit, such as an FPGA. The control circuit 14 and the control circuit 25 may be integrated into one chip. For example, the control circuit 14 and the control circuit 25 may be provided as a single FPGA.

2-3. Processing Circuit

The processing circuit 30 is a circuit to control the operation of the object detection system 1. For example, the processing circuit 30 can be defined by a computer system including one or more processors (microprocessors) and one or more memories. One or more processors execute a program to provide the function of the processing circuit 30.

The processing circuit 30 performs the object detection processing to detect an object in target space using an acoustic wave from the acoustic wave generator 10. The object detection processing includes the wave transmission processing and the determination processing.

In the wave transmission processing, the acoustic wave generator 10 is controlled to generate a series of the acoustic waves P1 of a time-varying frequency at target sound pressures that are associated with a frequency and correspond to the respective acoustic waves P1. More specifically, in the wave transmission processing, the adjustment circuit 13 adjusts the voltage V2 across the capacitor C1 such that the sound pressure of the acoustic wave P1 from the acoustic wave generator 10 becomes a target sound pressure. The driving switching element T1 in the driving circuit 12 is driven to cause the acoustic wave source 11 to generate an acoustic wave. In the wave transmission processing, for example, the processing circuit 30 transmits an instruction to the control circuit 14 to cause the control circuit 14 to control the driving circuit 12 and the adjustment circuit 13. The association between a frequency and a target sound pressure will be described below in "3. Association Between Frequency And Target Sound Pressure."

In the determination processing, a received-wave signal representing an acoustic wave received by the wave receiver 20 to receive an acoustic wave from target space is acquired from the wave receiver 20. In the determination processing, for example, a digital received-wave signal is acquired from the wave receiver 20. In the case where an object is present in target space, an acoustic wave from the target space includes a reflected wave (also referred to as an echo) of an acoustic wave that has been output from the acoustic wave generator 10 and reflected from an object. In the determination processing, it is determined whether an object is present in the target space based on the acquired received-wave signal. In the present preferred embodiment, for example, it is determined in the determination processing that an object is in the target space when the peak value of a cross-correlation function between a transmitted-wave signal representing a series of the acoustic waves P1 and a received-wave signal is greater than or equal to a threshold value. As the peak of a cross-correlation function, for example, the main lobe of a cross-correlation function is used. In the determination processing, a distance to an object is determined based on a received-wave signal when it is determined that an object is in target space. In the determination processing, for example, a distance to an object is determined based on a time at which the peak of a cross-correlation function between a transmitted-wave signal and a received-wave signal appears using a TOF (time of flight) technique. As described above, the frequency of a series of the acoustic waves P1 varies with time. In this case, the side lobe of a cross-correlation function can be reduced as compared with the case where a series of the acoustic waves P1 of a frequency that does not vary with time, that is, a constant frequency, is used. Accordingly, the main lobe of a cross-correlation function can be easily discriminated from the side lobe of the cross-correlation function, and object detection accuracy can be improved. The detection of an object, the measurement of a distance to an object, and the like by the use of an acoustic wave can be performed using techniques known in the related art, and the detailed description thereof will be omitted.

3. Association Between Frequency and Target Sound Pressure

Figure 4:
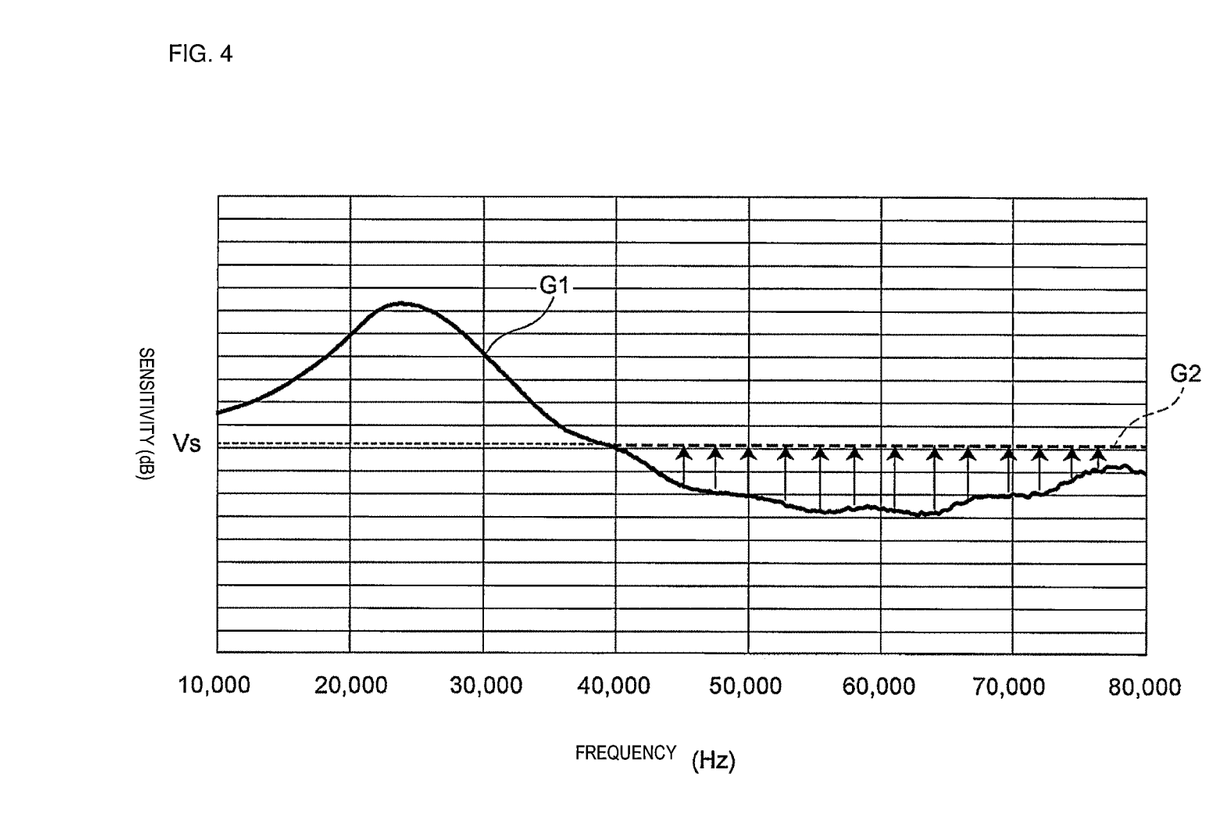
FIG. 4 is a graph illustrating frequency characteristics of a wave receiver in the object detection system in FIG. 1.

The association between a frequency and a target sound pressure will be described with reference to FIG. 4. FIG. 4 is a graph illustrating frequency characteristics of the wave receiver 20 in the object detection system 1. The frequency characteristics of the wave receiver 20 are determined based on the frequency characteristics of the microphone 21 included in the wave receiver 20. Referring to FIG. 4, G1 represents the frequency characteristics of the sensitivity of the wave receiver 20 to an acoustic wave of a predetermined sound pressure. That is, G1 represents the change in sensitivity of the wave receiver 20 when the sound pressure of an acoustic wave is constant and the frequency of the acoustic wave varies. As is apparent from G1, the sensitivity at about 60 kHz is lower than that at about 40 kHz. Since G1 is obtained when an acoustic wave has a constant predetermined sound pressure, the adjustment of a sound pressure of the acoustic wave P1 based on the frequency characteristics of the microphone 21 results in the adjustment of sensitivity of the wave receiver 20. From this point, a target sound pressure is set based on the frequency characteristics of the sensitivity of the wave receiver 20 to an acoustic wave of a predetermined sound pressure. A target sound pressure is set such that the sensitivity of the wave receiver 20 to an acoustic wave of a target sound pressure is in a predetermined range including a predetermined value Vs. As described above, the frequency of a series of the acoustic waves P1 varies in a predetermined frequency range. The predetermined frequency range is, for example, the range of about 40 kHz to about 80 kHz. Referring to FIG. 4, the sensitivity of the wave receiver 20 is below the predetermined value Vs in the range of about 40 kHz to about 80 kHz. As is represented by G2 in FIG. 4, it is preferable that a target sound pressure is set such that the sensitivity of the wave receiver 20 coincides with the predetermined value Vs. In reality, a target sound pressure may be set such that the sensitivity of the wave receiver 20 is in a predetermined range including the predetermined value Vs. The predetermined value Vs is the maximum value of the sensitivity of the wave receiver 20 to the acoustic wave P1 of a predetermined sound pressure in a predetermined frequency range. As a result, high sensitivity can be achieved in the predetermined frequency range. In this case, the target sound pressure of an acoustic wave of a frequency at which the sensitivity of the wave receiver 20 to an acoustic wave of a predetermined sound pressure is less than a predetermined value is set to be higher than the predetermined sound pressure. The predetermined range may be set such that the predetermined value Vs is between the upper limit and the median value of the predetermined range. That is, the upper limit of the predetermined value Vs may be greater than or equal to a predetermined value, and the median value of the predetermined range may be less than or equal to the predetermined value. In the present preferred embodiment, the upper limit of a predetermined range is the predetermined value Vs (that is, the maximum value of the sensitivity of the wave receiver 20 to the acoustic wave P1 of a predetermined sound pressure in a predetermined frequency range). The lower limit of the predetermined range is less than or equal to the predetermined value and is greater than the minimum value of the sensitivity of the wave receiver 20 to the acoustic wave P1 of a predetermined sound pressure in the predetermined frequency range. The lower limit of the predetermined range is, for example, Vs−k·d(0≤k<1) where d is the difference between the maximum value and the minimum value of the sensitivity of the wave receiver 20 to the acoustic wave P1 of a predetermined sound pressure in a predetermined frequency range. When k is less than or equal to about 0.5, the range of the change in the sensitivity of the wave receiver 20 to an acoustic wave of a target sound pressure in a predetermined frequency range can be set to be smaller than or equal to a half of the range of the change in the sensitivity of the wave receiver 20 to an acoustic wave of a predetermined sound pressure in the predetermined frequency range. That is, the predetermined range is narrower than the range of the change in the sensitivity of the wave receiver 20 to an acoustic wave of a predetermined sound pressure in a predetermined frequency range. As a result, the influence of frequency characteristics of sensitivity of the wave receiver 20 can be reduced and the decrease in object detection accuracy due to the distortion of a received-wave signal can be reduced or prevented. This leads to improvement of object detection accuracy. The predetermined range may be the range of, for example, about ±10% of the predetermined value Vs. That is, for example, the lower limit of the predetermined range may be about 0.9×Vs and the upper limit of the predetermined range may be about 1.1×Vs.

Thus, by making the association between a frequency and a target sound pressure, the influence of frequency characteristics of sensitivity of the wave receiver 20 can be reduced and the decrease in object detection accuracy due to the distortion of a received-wave signal can be reduced or prevented. Consequently, object detection accuracy can be improved.

4. Advantageous Effect, etc.

The object detection system 1 described above includes the acoustic wave generator 10 to generate an acoustic wave by generating heat upon energization and the processing circuit 30 to perform object detection processing to detect an object in target space using an acoustic wave from the acoustic wave generator 10. The object detection processing includes the wave transmission processing in which the acoustic wave generator 10 is controlled to generate a series of the acoustic waves P1 of a time-varying frequency at target sound pressures that are associated with a frequency and correspond to the respective acoustic waves P1 and the determination processing in which a received-wave signal representing an acoustic wave received by the wave receiver 20 for receiving an acoustic wave from target space is acquired from the wave receiver 20 and it is determined whether an object is present based on the received-wave signal. With this configuration, object detection accuracy can be improved. The target sound pressure is set, based on the frequency characteristics of the sensitivity of the wave receiver 20 to an acoustic wave of a predetermined sound pressure, such that the sensitivity of the wave receiver 20 to an acoustic wave of the target sound pressure is in a predetermined range including a predetermined value. The frequency of a series of the acoustic waves P1 varies in a predetermined frequency range. The predetermined value is the maximum value of the sensitivity of the wave receiver 20 to the acoustic wave P1 of a predetermined sound pressure in the predetermined frequency range.

In the object detection system 1, the upper limit of the predetermined range is greater than or equal to the predetermined value and the median value of the predetermined range is equal to or less than the predetermined value. With this configuration, object detection accuracy can be improved.

In the object detection system 1, the lower limit of the predetermined range is less than the predetermined value and is greater than the minimum value of the sensitivity of the wave receiver 20 to the acoustic wave P1 of a predetermined sound pressure in the predetermined frequency range. With this configuration, object detection accuracy can be improved.

In the object detection system 1, the upper limit of the predetermined range is the predetermined value. With this configuration, object detection accuracy can be improved.

In the object detection system 1, the target sound pressure of an acoustic wave of a frequency at which the sensitivity of the wave receiver 20 to an acoustic wave of a predetermined sound pressure is less than the predetermined value is higher than the predetermined sound pressure. With this configuration, object detection accuracy can be improved.

In the object detection system 1, the predetermined range is, for example, the range of about ±10% of the predetermined value Vs. With this configuration, object detection accuracy can be improved.

The object detection system 1 includes the acoustic wave generator 10 to generate an acoustic wave by generating heat upon energization and the processing circuit 30 to perform object detection processing to detect an object in target space using an acoustic wave from the acoustic wave generator 10. The object detection processing includes the wave transmission processing in which the acoustic wave generator 10 is controlled to generate a series of the acoustic waves P1 of a time-varying frequency at target sound pressures that are associated with a frequency and correspond to the respective acoustic waves P1 and the determination processing in which a received-wave signal representing an acoustic wave received by the wave receiver 20 to receive an acoustic wave from target space is acquired from the wave receiver 20 and it is determined whether an object is present based on the received-wave signal. The frequency of a series of the acoustic waves P1 varies in a predetermined frequency range. The target sound pressure is set, based on the frequency characteristics of the sensitivity of the wave receiver 20 to an acoustic wave of a predetermined sound pressure, such that the sensitivity of the wave receiver 20 to an acoustic wave of the target sound pressure coincides with a predetermined value. The predetermined value is the maximum value of the sensitivity of the wave receiver 20 to the acoustic wave P1 of a predetermined sound pressure in the predetermined frequency range. With this configuration, object detection accuracy can be improved.

In the object detection system 1, it is determined in the determination processing that an object is present when the peak value of a cross-correlation function between a transmitted-wave signal representing a series of the acoustic waves P1 and a received-wave signal is greater than or equal to a threshold value. With this configuration, object detection accuracy can be improved.

In the object detection system 1, a distance to an object is determined based on a received-wave signal when it is determined that an object is present in the determination processing. With this configuration, a distance to an object can be obtained.

In the object detection system 1, the acoustic wave generator 10 includes the driving circuit 12 including the capacitor C1 charged by the direct-current power supply V1 and the driving switching element T1 to supply power from the capacitor C1 to the acoustic wave source 11 to generate an acoustic wave by generating heat upon energization and the adjustment circuit 13 to adjust the sound pressure of an acoustic wave to be output from the acoustic wave generator 10 by adjusting the voltage V2 across the capacitor C1 in the driving circuit 12. In the wave transmission processing, the adjustment circuit 13 adjusts the voltage V2 across the capacitor C1 such that the sound pressure of an acoustic wave to be output from the acoustic wave generator 10 becomes a target sound pressure, and the driving switching element T1 in the driving circuit 12 is driven to cause the acoustic wave source 11 to generate an acoustic wave. With this configuration, the sound pressure of an acoustic wave to be output from the acoustic wave generator 10 can be easily adjusted.

In the object detection system 1, the adjustment circuit 13 includes the inductor L1 electrically connected between the direct-current power supply V1 and the capacitor C1 and the adjustment switching element T2 electrically connected in parallel to a series circuit of the inductor L1 and the direct-current power supply V1. The adjustment circuit 13 adjusts the voltage V2 across the capacitor C1 in the ON period T2on of the adjustment switching element T2. With this configuration, a simple circuit configuration can be obtained.

In the object detection system 1, the adjustment circuit 13 includes the diode D1, the anode of which is electrically connected to the inductor L1 and the cathode of which is electrically connected to the capacitor C1. With this configuration, the possibility that a current flows from the capacitor C1 to the inductor L1 and the capacitor C1 is accidentally discharged can be reduced or prevented.

In the object detection system 1, the state of the adjustment switching element T2 is changed from the ON state to the OFF state before the ON period T1on of the driving switching element T1. With this configuration, the sound pressure of an acoustic wave can be easily adjusted.

In the object detection system 1, the switching frequency of the driving switching element T1 is, for example, greater than or equal to about 20 kHz. With this configuration, object detection accuracy can be improved.

Modification

Preferred embodiments of the present invention are not limited to the above-described preferred embodiment. The above-described preferred embodiment can be variously modified depending on design and the like as long as the advantageous effects of the present invention can be achieved. Modifications of the above-described preferred embodiment will be described below. The modifications to be described below can be applied in appropriate combination.

1. First Modification

Figure 5:
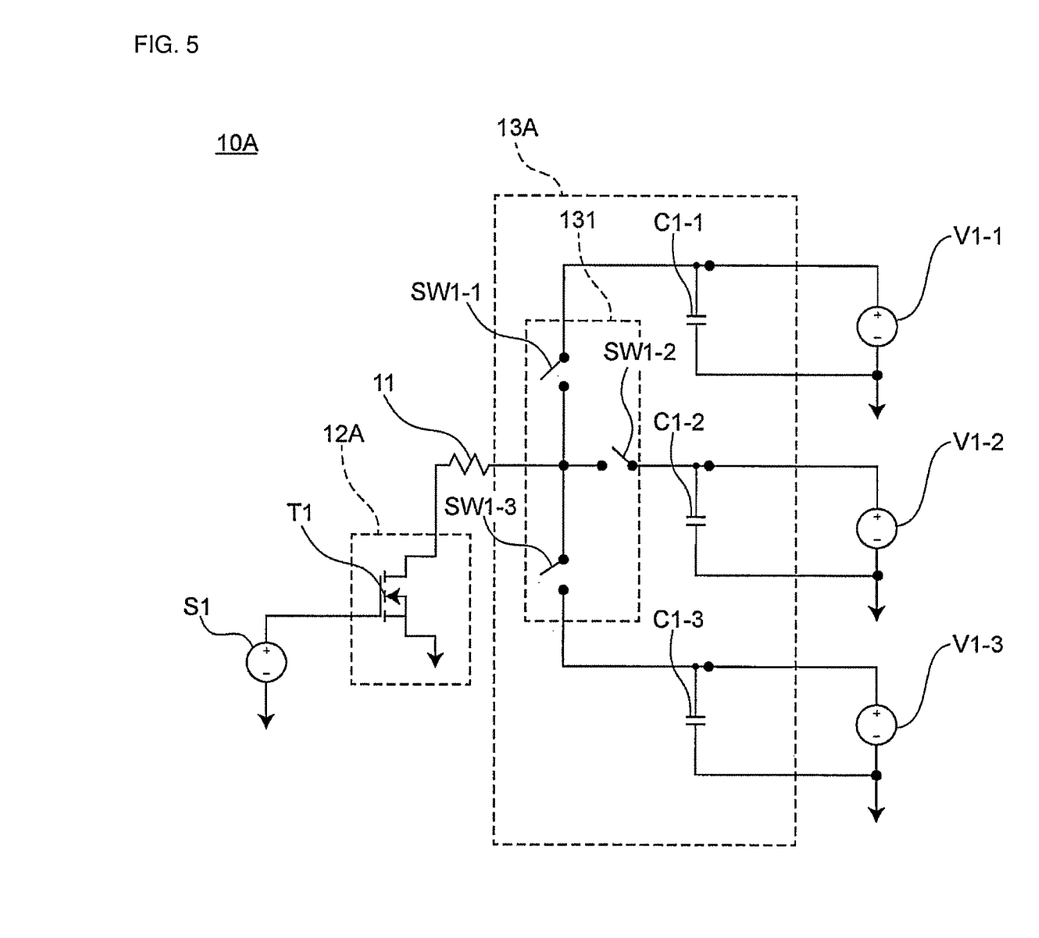
FIG. 5 is a block diagram illustrating an exemplary configuration of an acoustic wave generator that is a first modification of a preferred embodiment of the present invention.

FIG. 5 is a circuit diagram illustrating an exemplary configuration of an acoustic wave generator 10A that is a first modification of a preferred embodiment of the present invention. The acoustic wave generator 10A includes the acoustic wave source 11, a driving circuit 12A, and an adjustment circuit 13A. The acoustic wave generator 10A includes the control circuit 14 as in the acoustic wave generator 10, but the illustration of the control circuit 14 is omitted in FIG. 5.

The driving circuit 12A includes the driving switching element T1 to supply power from a predetermined capacitor to the acoustic wave source 11 to generate an acoustic wave by generating heat upon energization. The driving switching element T1 is used to control the supply of power to the acoustic wave source 11. The driving switching element T1 is connected between the acoustic wave source 11 and the ground. When the driving switching element T1 is in the ON state, power is supplied to the acoustic wave source 11. When the driving switching element T1 is in the OFF state, power is not supplied to the acoustic wave source 11. Bringing the driving switching element T1 into the ON or OFF state allows the acoustic wave source 11 to generate an acoustic wave. The driving switching element T1 is, for example, an n-type MOSFET.

The adjustment circuit 13A adjusts the sound pressure of an acoustic wave to be output from the acoustic wave generator 10 by selecting, as a predetermined capacitor, at least one of a plurality of (for example, three in the drawing) capacitors C1-1 to C1-3 (hereinafter collectively referred to as C1) charged by a plurality of (for example, three in the drawing) direct-current power supplies V1-1 to V1-3 (hereinafter collectively referred to as V1) of different voltages, respectively. As illustrated in FIG. 5, the adjustment circuit 13A includes the plurality of capacitors C1-1 to C1-3 and a switching circuit 131.

The plurality of capacitors C1-1 to C1-3 are charged by the plurality of direct-current power supplies V1-1 to V1-3 of different voltages, respectively. The capacitor C1 is used to supply power to the acoustic wave source 11. The capacitor C1 is electrically connected between the ground and the node between the direct-current power supply V1 and the acoustic wave source 11. The capacitor C1 is charged by the direct-current power supply V1. The capacitor C1 is, for example, an electrolytic capacitor or a ceramic capacitor.

The switching circuit 131 selects a power supply source for the acoustic wave source 11 from among the plurality of capacitors C1. More specifically, the switching circuit 131 electrically connects at least one of the plurality of capacitors C1 to the acoustic wave source 11 to cause the acoustic wave generator 10A to generate an acoustic wave at a target sound pressure associated with a frequency. For example, a plurality of sets of the capacitor C1 and the direct-current power supply V1 are used to obtain target sound pressures associated with different frequencies.

The switching circuit 131 includes a plurality of (for example, three in the drawing) switches SW1-1 to SW1-3 (hereinafter collectively referred to as SW1) as illustrated in FIG. 5. The plurality of switches SW1-1 to SW1-3 are electrically connected between the acoustic wave source 11 and the plurality of capacitors C1-1 to C1-3, respectively. In the switching circuit 131, one of the plurality of switches SW1-1 to SW1-3 is turned on and the remains of them are turned off. One of the plurality of capacitors C1-1 to C1-3 is therefore electrically connected to the acoustic wave source 11.

The control circuit 14 controls the driving circuit 12A and the switching circuit 131 in the adjustment circuit 13A. To cause the acoustic wave generator 10 to generate a series of the acoustic waves P1 of a time-varying frequency at target sound pressures that are associated with a frequency and correspond to the respective acoustic waves P1, the control circuit 14 electrically connects at least one of the plurality of capacitors C1 to the acoustic wave source 11 by controlling the switch SW1 in the switching circuit 131.

In the case where the object detection system 1 includes the acoustic wave generator 10A, the processing circuit 30 controls the control circuit 14 in the acoustic wave generator 10A to perform wave transmission processing to be described below. In the wave transmission processing, the adjustment circuit 13A selects, as a predetermined capacitor, the capacitor C1 corresponding to a target sound pressure from among the plurality of capacitors C1 and the driving switching element T1 in the driving circuit 12A is driven to cause the acoustic wave source 11 to generate an acoustic wave.

Thus, the object detection system 1 can set the respective sound pressures of a series of the acoustic waves P1 of a time-varying frequency to be output from the acoustic wave generator 10A to target sound pressures associated with a frequency. That is, a sound pressure can be set in accordance with the frequency of the acoustic wave P1. Accordingly, the influence of frequency characteristics of sensitivity of the wave receiver 20 can be reduced and the decrease in object detection accuracy due to the distortion of a received-wave signal can be reduced or prevented. As described above, object detection accuracy can be improved by using the object detection system 1.

In the object detection system 1 described above, the acoustic wave generator 10A includes the driving circuit 12A including the driving switching element T1 to supply power from the predetermined capacitor C1 to the acoustic wave source 11 to generate an acoustic wave by generating heat upon energization and the adjustment circuit 13A to adjust the sound pressure of an acoustic wave to be output from the acoustic wave generator 10A by selecting, as the predetermined capacitor C1, at least one of the plurality of capacitors C1 charged by the plurality of respective direct-current power supplies V1 of different voltages. In the wave transmission processing, the adjustment circuit 13A selects, as the predetermined capacitor C1, the capacitor C1 corresponding to a target sound pressure from among the plurality of capacitors C1 and the driving switching element T1 in the driving circuit 12A is driven to cause the acoustic wave source 11 to generate an acoustic wave. With this configuration, the sound pressure of an acoustic wave to be output from the acoustic wave generator 10A can be easily adjusted.

2. Second Modification

Figure 6:
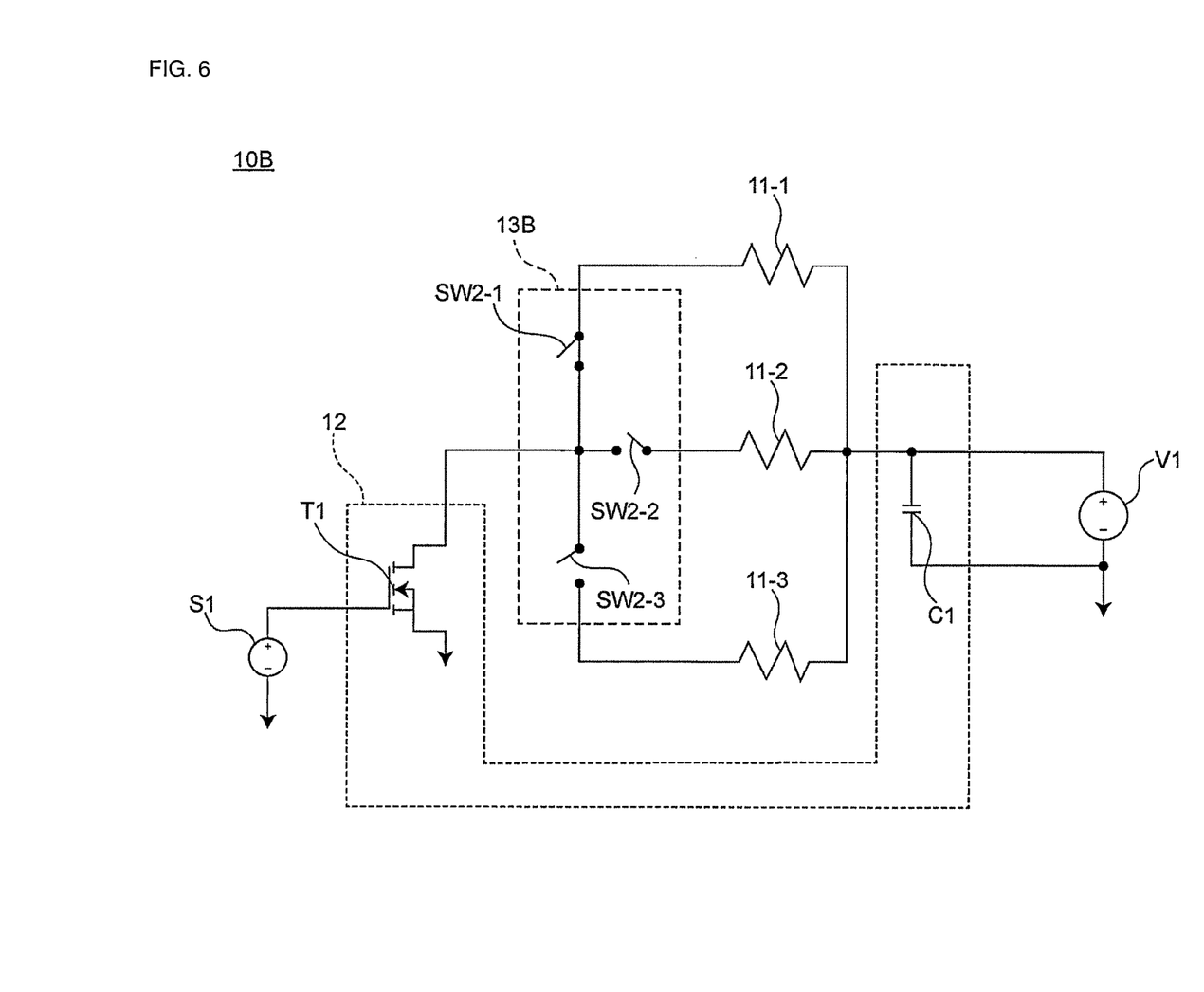
FIG. 6 is a block diagram illustrating an exemplary configuration of an acoustic wave generator that is a second modification of a preferred embodiment of the present invention.

FIG. 6 is a circuit diagram illustrating an exemplary configuration of an acoustic wave generator 10B that is a second modification of a preferred embodiment of the present invention. The acoustic wave generator 10B includes a plurality of (for example, three in the drawing) acoustic wave sources 11-1 to 11-3 (hereinafter collectively referred to as 11), the driving circuit 12, and an adjustment circuit 13B. The acoustic wave generator 10B includes the control circuit 14 as in the acoustic wave generator 10, but the illustration of the control circuit 14 is omitted in FIG. 6.

The plurality of acoustic wave sources 11-1 to 11-3 are electrically connected between the direct-current power supply V1 and the ground. As illustrated in FIG. 6, the plurality of acoustic wave sources 11-1 to 11-3 are connected in parallel.

The driving circuit 12 includes the capacitor C1 charged by the direct-current power supply V1 and the driving switching element T1 to supply power from the capacitor C1 to the predetermined acoustic wave source 11. The predetermined acoustic wave source 11 is selected from among the plurality of acoustic wave sources 11-1 to 11-3. The driving circuit 12 supplies power to the predetermined acoustic wave source 11 to cause the predetermined acoustic wave source 11 to generate an acoustic wave. The driving circuit 12 includes the resistor R1. The resistor R1 defines an overcurrent protection element electrically connected between the capacitor C1 and the direct-current power supply V1.

The adjustment circuit 13B adjusts the sound pressure of an acoustic wave to be output from the acoustic wave generator 10B by selecting, as the predetermined acoustic wave source 11, at least one of the plurality of acoustic wave sources 11-1 to 11-3. As illustrated in FIG. 6, the adjustment circuit 13B selects a destination to which power from the capacitor C1 is to be supplied from among the plurality of acoustic wave sources 11-1 to 11-3. More specifically, the adjustment circuit 13B electrically connects at least one of the plurality of acoustic wave sources 11-1 to 11-3 to the capacitor C1 to cause the acoustic wave generator 10B to generate an acoustic wave at a target sound pressure associated with a frequency. The plurality of acoustic wave sources 11 are used to obtain target sound pressures associated with different frequencies.

As illustrated in FIG. 6, the adjustment circuit 13B includes a plurality of (three in the drawing) switches SW2-1 to SW2-3 (hereinafter collectively referred to as SW2). The plurality of switches SW2-1 to SW2-3 are electrically connected between the plurality of acoustic wave sources 11-1 to 11-3 and the capacitor C, respectively. In the adjustment circuit 13B, one of the plurality of switches SW2-1 to SW2-3 is turned on and the remaining ones of them are turned off. One of the plurality of acoustic wave sources 11-1 to 11-3 is therefore electrically connected to the capacitor C1.

The control circuit 14 controls the driving circuit 12 and the adjustment circuit 13B. To cause the acoustic wave generator 10B to generate an acoustic wave at a target sound pressure associated with a frequency, the control circuit 14 electrically connects at least one of the plurality of acoustic wave sources 11 to the capacitor C1 by controlling the switch SW2 in the adjustment circuit 13B.

In the case where the object detection system 1 includes the acoustic wave generator 10B, the processing circuit 30 controls the control circuit 14 in the acoustic wave generator 10B to perform wave transmission processing to be described below. In the wave transmission processing, the adjustment circuit 13B selects, as the predetermined acoustic wave source 11, the acoustic wave source 11 corresponding to a target sound pressure from among the plurality of acoustic wave sources 11 and the driving switching element T1 in the driving circuit 12 is driven to cause the predetermined acoustic wave source 11 to generate an acoustic wave.

Thus, the object detection system 1 can set the respective sound pressures of a series of the acoustic waves P1 of a time-varying frequency to be output from the acoustic wave generator 10B to target sound pressures associated with a frequency. That is, a sound pressure can be set in accordance with the frequency of the acoustic wave P1. Accordingly, the influence of frequency characteristics of sensitivity of the wave receiver 20 can be reduced and the decrease in object detection accuracy due to the distortion of a received-wave signal can be reduced or prevented. As described above, object detection accuracy can be improved by using the object detection system 1.

In the object detection system 1 described above, the acoustic wave generator 10B includes the plurality of acoustic wave sources 11 to generate acoustic waves of different sound pressures by generating heat upon energization, the driving circuit 12 including the capacitor C1 charged by the direct-current power supply V1 and the driving switching element T1 to supply power from the capacitor C1 to the predetermined acoustic wave source 11, and the adjustment circuit 13B to adjust the sound pressure of an acoustic wave to be output from the acoustic wave generator 10B by selecting, as the predetermined acoustic wave source 11, at least one of the plurality of acoustic wave sources 11. In the wave transmission processing, the adjustment circuit 13B selects, as the predetermined acoustic wave source 11, the acoustic wave source 11 corresponding to a target sound pressure from among the plurality of acoustic wave sources 11 and the driving switching element T1 in the driving circuit 12 is driven to cause the predetermined acoustic wave source 11 to generate an acoustic wave. With this configuration, the sound pressure of an acoustic wave to be output from the acoustic wave generator 10B can be easily adjusted.

3. Other Modifications

The frequency of a series of the acoustic waves P decreases with time in the above-described preferred embodiment, but may increase with time.

In a modification of a preferred embodiment of the present invention, the predetermined value does not necessarily have to be the representative value of the sensitivity of the wave receiver 20 to an acoustic wave of a predetermined sound pressure in a predetermined frequency range. That is, the predetermined value may be a desired value. However, when the predetermined value is the representative value of the sensitivity of the wave receiver 20 to an acoustic wave of a predetermined sound pressure in a predetermined frequency range, the difference between the predetermined sound pressure and a target sound pressure can be reduced and the setting of a target sound pressure can be easily performed.

In a modification of a preferred embodiment of the present invention, the predetermined range may be set to achieve the reduction in the influence of frequency characteristics of sensitivity of the wave receiver 20 in consideration of the frequency characteristics of the sensitivity of the wave receiver 20 to an acoustic wave of a predetermined sound pressure.

In the first modification, the number of the direct-current power supplies V1 and the number of the capacitors C1 are not particularly limited. The adjustment circuit 13A may connect the two or more capacitor C1 to the acoustic wave source 11 as needed. The plurality of capacitors C1 are connected in parallel to the acoustic wave source 11 in the first modification, but may be connected in series to the acoustic wave source 11. In this case, a voltage to be applied to the acoustic wave source 11 can be adjusted by causing the switching circuit 131 to change the number of series connections of the plurality of capacitors C1. The configuration in the first modification is also applicable to the acoustic wave generator 10 and the acoustic wave generator 10B.

In the second modification, the number of the acoustic wave sources 11 are not particularly limited. The adjustment circuit 13B may connect the two or more acoustic wave sources 11 to the capacitor C1 as needed. The plurality of acoustic wave sources 11 are connected in parallel to the capacitor C1 in the second modification, but may be connected in series to the capacitor C1. In this case, a sound pressure can be adjusted by causing the adjustment circuit 13B to change the number of series connections of the plurality of acoustic wave sources 11. The configuration in the second modification is also applicable to the acoustic wave generator 10 and the acoustic wave generator 10A.

In a modification, another overcurrent protection element may be used instead of the resistor R1. Examples of an overcurrent protection element include a current fuse, a fuse resistor, and bimetal. An overcurrent protection element does not necessarily have to be provided.

Preferred embodiments of the present invention are applicable to an acoustic wave generator. Specifically, preferred embodiments of the present invention are applicable to an object detection system to detect an object using an acoustic wave.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An object detection system comprising:
   an acoustic wave generator to generate an acoustic wave by generating heat upon energization; and
   a processing circuit to perform object detection processing to detect an object in a target space using an acoustic wave from the acoustic wave generator; wherein
   the object detection processing includes:
      wave transmission processing in which the acoustic wave generator is controlled to generate a series of acoustic waves of a time-varying frequency at target sound pressures that are associated with a frequency and correspond to the respective acoustic waves; and
      determination processing in which a received-wave signal representing an acoustic wave received by a wave receiver to receive an acoustic wave from the target space is acquired from the wave receiver and it is determined whether the object is present in the target space based on the received-wave signal;
   each of the target sound pressures is set, based on frequency characteristics of sensitivity of the wave receiver to an acoustic wave of a predetermined sound pressure, such that sensitivity of the wave receiver to an acoustic wave of the target sound pressure is in a predetermined range including a predetermined value;
   a frequency of the series of acoustic waves varies in a predetermined frequency range; and
   the predetermined value is a maximum value of the sensitivity of the wave receiver to an acoustic wave of a predetermined sound pressure in the predetermined frequency range.

2. The object detection system according to claim 1, wherein
   an upper limit of the predetermined range is greater than or equal to the predetermined value; and
   a median value of the predetermined range is less than or equal to the predetermined value.

3. The object detection system according to claim 1, wherein a lower limit of the predetermined range is less than or equal to the predetermined value and is greater than a minimum value of the sensitivity of the wave receiver to an acoustic wave of a predetermined sound pressure in the predetermined frequency range.

4. The object detection system according to claim 3, wherein an upper limit of the predetermined range is the predetermined value.

5. The object detection system according to claim 3, wherein a target sound pressure of an acoustic wave of a frequency at which the sensitivity of the wave receiver to an acoustic wave of a predetermined sound pressure is less than the predetermined value is higher than the predetermined sound pressure.

6. The object detection system according to claim 1, wherein the predetermined range is a range of about +10% of the predetermined value.

7. An object detection system comprising:
   an acoustic wave generator to generate an acoustic wave by generating heat upon energization; and
   a processing circuit to perform object detection processing to detect an object in target space using an acoustic wave from the acoustic wave generator; wherein
   the object detection processing includes:
      wave transmission processing in which the acoustic wave generator is controlled to generate a series of acoustic waves of a time-varying frequency at target sound pressures that are associated with a frequency and correspond to the respective acoustic waves; and
      determination processing in which a received-wave signal representing an acoustic wave received by a wave receiver to receive an acoustic wave from the target space is acquired from the wave receiver and it is determined whether the object is present in the target space based on the received-wave signal;
   a frequency of the series of acoustic waves varies in a predetermined frequency range;
   each of the target sound pressures is set, based on frequency characteristics of sensitivity of the wave receiver to an acoustic wave of a predetermined sound pressure, such that sensitivity of the wave receiver to an acoustic wave of the target sound pressure coincides with a predetermined value; and
   the predetermined value is a maximum value of the sensitivity of the wave receiver to an acoustic wave of a predetermined sound pressure in the predetermined frequency range.

8. The object detection system according to claim 1, wherein, in the determination processing, it is determined that the object is present when a peak value of a cross-correlation function between a transmitted-wave signal representing the series of acoustic waves and the received-wave signal is greater than a threshold value.

9. The object detection system according to claim 7, wherein, in the determination processing, it is determined that the object is present when a peak value of a cross-correlation function between a transmitted-wave signal representing the series of acoustic waves and the received-wave signal is greater than a threshold value.

10. The object detection system according to claim 1, wherein
    the acoustic wave generator includes:
       a driving circuit including a capacitor charged by a direct-current power supply and a driving switch to supply power from the capacitor to an acoustic wave source to generate an acoustic wave by generating heat upon energization; and an adjustment circuit to adjust a sound pressure of an acoustic wave to be output from the acoustic wave generator by adjusting a voltage across the capacitor in the driving circuit; and in the wave transmission processing:

the adjustment circuit is operable to adjust a voltage across the capacitor such that a sound pressure of an acoustic wave to be output from the acoustic wave generator becomes the target sound pressure; and the driving switch in the driving circuit is operable to be driven to cause the acoustic wave source to generate an acoustic wave.

11. The object detection system according to claim 10, wherein the adjustment circuit includes:

an inductor electrically connected between the direct-current power supply and the capacitor; and an adjustment switch electrically connected in parallel to a series circuit of the inductor and the direct-current power supply; and the adjustment circuit is operable to adjust a voltage across the capacitor in an ON period of the adjustment switch.

12. The object detection system according to claim 11, wherein the adjustment circuit includes a diode;

an anode of the diode is electrically connected to the inductor; and a cathode of the diode is electrically connected to the capacitor.

13. The object detection system according to claim 11, wherein the adjustment switch is in an ON state in an ON period of the driving switch and is turned on simultaneously with the driving switch.

14. The object detection system according to claim 7, wherein the acoustic wave generator includes:

a driving circuit including a capacitor charged by a direct-current power supply and a driving switch to supply power from the capacitor to an acoustic wave source to generate an acoustic wave by generating heat upon energization; and an adjustment circuit to adjust a sound pressure of an acoustic wave to be output from the acoustic wave generator by adjusting a voltage across the capacitor in the driving circuit; and in the wave transmission processing:

the adjustment circuit is operable to adjust a voltage across the capacitor such that a sound pressure of an acoustic wave to be output from the acoustic wave generator becomes the target sound pressure; and the driving switch in the driving circuit is operable to be driven to cause the acoustic wave source to generate an acoustic wave.

15. The object detection system according to claim 14, wherein the adjustment circuit includes:

an inductor electrically connected between the direct-current power supply and the capacitor; and an adjustment switch electrically connected in parallel to a series circuit of the inductor and the direct-current power supply; and the adjustment circuit is operable to adjust a voltage across the capacitor in an ON period of the adjustment switch.

16. The object detection system according to claim 15, wherein the adjustment circuit includes a diode;

an anode of the diode is electrically connected to the inductor; and a cathode of the diode is electrically connected to the capacitor.

17. The object detection system according to claim 15, wherein the adjustment switch is in an ON state in an ON period of the driving switch and is turned on simultaneously with the driving switch.

18. The object detection system according to claim 1, wherein the acoustic wave generator includes:

a driving circuit including a driving switch to supply power from a predetermined capacitor to an acoustic wave source to generate an acoustic wave by generating heat upon energization; and an adjustment circuit to adjust a sound pressure of an acoustic wave to be output from the acoustic wave generator by selecting, as the predetermined capacitor, at least one of a plurality of capacitors charged by a plurality of respective direct-current power supplies of different voltages; and in the wave transmission processing:

the adjustment circuit is operable to select, as the predetermined capacitor, a capacitor corresponding to the target sound pressure from among the plurality of capacitors; and the driving switch in the driving circuit is operable to be driven to cause the acoustic wave source to generate an acoustic wave.

19. The object detection system according to claim 1, wherein the acoustic wave generator includes:

a plurality of acoustic wave sources to generate acoustic waves of different sound pressures by generating heat upon energization;

a driving circuit including a capacitor charged by a direct-current power supply and a driving switch to supply power from the capacitor to a predetermined acoustic wave source; and an adjustment circuit to adjust a sound pressure of an acoustic wave to be output from the acoustic wave generator by selecting, as the predetermined acoustic wave source, at least one of the plurality of acoustic wave sources; and in the wave transmission processing:

the adjustment circuit is operable to select, as the predetermined acoustic wave source, an acoustic wave source corresponding to the target sound pressure from among the plurality of acoustic wave sources; and the driving switch in the driving circuit is operable to be driven to cause the predetermined acoustic wave source to generate an acoustic wave.

20. The object detection system according to claim 10, wherein a switching frequency of the driving switch is greater than or equal to about 20 kHz.

* * * * *